(12) United States Patent
Lin et al.

(10) Patent No.: US 9,975,468 B1
(45) Date of Patent: May 22, 2018

(54) UNIVERSAL WRENCH ASSEMBLY

(71) Applicant: Hangzhou Golden Sun Auto Parts Co., Ltd., Hangzhou (CN)

(72) Inventors: Chenshan Lin, Hangzhou (CN); Shaoyong Zheng, Hangzhou (CN); Jinqin Fu, Hangzhou (CN); Xiaohong Tang, Hangzhou (CN); Peng Cao, Hangzhou (CN); Xue'e Wang, Hangzhou (CN)

(73) Assignee: HANGZHOU GOLDEN SUN AUTO PARTS CO., LTD., Hangzhou (CN)

( * ) Notice: Subject to any disclaimer, the term of this patent is extended or adjusted under 35 U.S.C. 154(b) by 0 days. days.

(21) Appl. No.: 15/712,156

(22) Filed: Sep. 22, 2017

(30) Foreign Application Priority Data

Jul. 13, 2017 (CN) .......................... 2017 1 0570997

(51) Int. Cl.
*B60P 7/08* (2006.01)

(52) U.S. Cl.
CPC .............. *B60P 7/083* (2013.01); *B60P 7/0807* (2013.01)

(58) Field of Classification Search
CPC ........ B60P 7/083; B60P 7/0846; B60P 7/0876
USPC ............ 410/12, 96–100, 103, 106, 110, 116; 296/98, 100.15; 24/265 CD, 68 CD, 24/71 ST, 70 ST, 69 ST
See application file for complete search history.

(56) References Cited

U.S. PATENT DOCUMENTS

| | | | | |
|---|---|---|---|---|
| 5,338,136 A | * | 8/1994 | Hetchler | B60P 7/083 410/100 |
| 5,961,263 A | * | 10/1999 | Nunez | B60P 7/0846 410/100 |
| 7,909,553 B2 | * | 3/2011 | Snyder | B60R 9/00 410/100 |

* cited by examiner

*Primary Examiner* — Stephen Gordon
(74) *Attorney, Agent, or Firm* — Perkins Coie LLP

(57) ABSTRACT

A universal wrench assembly includes a wrench, one end has a head, and the other end has a handle. The head has a groove with a partial spherical surface for engaging a workpiece. One side of the groove has a through-hole, a rotating shaft is rotatablely installed in the through-hole. A supporting housing has a side wall and an upper wall, and the side wall and the upper wall connect and form an installing cavity. The upper wall has an insert hole. An elastic slot is disposed on an upper wall at one side of the insert hole, the side wall has a through groove, a lower end of the through groove has an opening, and an upside has a lateral limiting area. A fixing rod, with one end pass through the insert hole and the rotating cavity and rotatablely disposed at an axial central area of the rotating shaft.

7 Claims, 4 Drawing Sheets

UNIVERSAL WRENCH ASSEMBLY

CROSS-REFERENCE TO RELATED APPLICATIONS

This Non-provisional application claims priority under 35 U.S.C. § 119(a) on Patent Application No(s). 201710570997.8 filed in People's Republic of China on Jul. 13, 2017, the entire contents of which are hereby incorporated by reference.

TECHNOLOGY FIELD

This invention relates to the field of auto parts manufacturing, and more particularly, to a universal wrench assembly.

BACKGROUND ART

Pick-up truck is a motorcycle type having a car cab and an open packing case at the same time.

Due to its beautiful shape, good comfort like the car, strong power, low price and flexible practicality for both passengers and goods, pick-up trucks are very popular among consumers. However, as the packing case of the pick-up truck is open, goods in the packing case suffer from the sun, the rain and the thief, such disadvantages affect the spread and use of the pick-up truck. All the existing universal wrench assemblies in the market are hung vertically to the railings of the packing cases. Since the wrench is hung vertically, the handle of the wrench is vertical downwardly. Thus, the goods cannot be placed in the area near the wrench inside the packing case.

SUMMARY OF THE INVENTION

Aiming at the above-mentioned technical problems, this invention provides a universal wrench assembly to solve the disadvantage that the existing universal wrench assembly occupies a large space if the wrench assembly is fixed vertically, causing the goods cannot be placed.

The technical solution adopted by this invention is as follows.

A universal wrench assembly, comprising:

a wrench, wherein one end has a head capable of cooperating with a workpiece and exerting torque on the workpiece, the other end is provided with a handle; the head has a groove with a partial spherical surface for engaging the workpiece; one side of the groove has a through-hole, a rotating shaft is rotatablely installed in the through-hole; and a longitudinal outer wall of the head is recessed inward to form a rotating cavity;

a supporting housing, having a side wall facing the rotating shaft and an upper wall located above the rotating shaft, wherein the side wall and the upper wall connect and form an installing cavity; the head is installed in the installing cavity; the upper wall has an insert hole; an elastic slot is disposed at the upper wall and located at one side of the insert hole, the elastic slot is used for locking a strip-shaped object to achieve fixation; the side wall has a strip-shaped through groove for inserting the handle, a lower end of the through groove has an opening, a lateral limiting area is disposed above the opening, and the limiting area is used for limiting a part of the handle which is rotated into the limiting area; and a fixing rod, wherein one end passes through the insert hole and the rotating cavity in turn and is rotatablely installed at an axial central area of the rotating shaft; and when the wrench rotates around the rotating shaft, the fixing rod is used for relatively rotating around the rotating shaft in the rotating cavity.

By fixing the elastic slot of the supporting housing to the strip-shaped railing of the truck or the pick-up truck, the wrench of the invention can rotate around the rotating shaft, such that the wrench is horizontally fixed at the downside of the strip-shaped railing, and the handle of the wrench is limited by the lateral through groove to prevent the handle from falling, which authentically solve the disadvantage of occupying a large space if the wrench is fixed vertically which causes the goods unable to be placed.

Optionally, the supporting housing may further have a barrier, and the barrier may be located at one side of the side wall and may face the groove.

Optionally, the barrier may have a pin hole, an insert pin may be inserted in the pin hole, the insert pin may pass through the pin hole to insert into the groove and may cling to an upper inside wall of the groove, and when the wrench rotates around the rotating shaft, the insert pin may be used for pressing against and sliding along the upper inside wall of the groove.

Optionally, the rotating shaft may be a barrel nut, a through slot hole may be disposed at a middle of the barrel nut, and the slot hole may cooperate with a thread of a lower end of the fixing rod.

Optionally, an insert may be disposed between the insert hole and the fixing rod, and the fixing rod may be in clearance fit with the insert.

Optionally, a tail end of the limiting area may have a locking block protruding upward, and the locking block may be used for limiting a lateral movement of the handle. At present, the handle of the conventional universal wrench assembly in the vertical direction is easily to be hooked outward by the goods, which leads to the locking failure of the wrench and causes the roof to be opened, thereby greatly increasing the insecurity during driving. Disposing the locking block protruding upward at the tail end of the limiting area can effectively limit the lateral movement of the handle and prevent the handle from being hooked outward by the goods, which leads to the risk of locking failure of the wrench. Thus, the security is greatly increased during driving.

Optionally, the center axis of the elastic slot and the axis of the handle limited in the limiting area may have an angle of 5°-45°.

The beneficial effects of this technical solution lie in: by fixing the elastic slot of the supporting housing to the strip-shaped railing of the truck or the pick-up truck, the wrench of the invention can rotate around the rotating shaft, such that the wrench is horizontally fixed at the downside of the strip-shaped railing, and the handle of the wrench is limited by a lateral through groove to prevent the handle from falling, which authentically solve the disadvantage of occupying a large space when the wrench is fixed vertically which causes the goods unable to be placed.

Reference numbers in the figures:

1. wrench; 2. head; 3. handle; 4. groove; 5. through-hole; 6. rotating shaft; 7. rotating cavity; 8. side wall; 9. upper wall; 10. installing cavity; 11. insert hole; 12. elastic slot; 13. through groove; 14. opening; 15. limiting area; 16. fixing rod; 17. barrier; 18. pin hole; 19. insert pin; 21. slot hole; 22. insert; 23. locking block; 24. supporting housing.

DETAILED DESCRIPTION OF THE INVENTION

The invention will be described in detail hereinbelow with reference to the accompanying drawings.

The up, down, left, and right of the invention are defined according to the position when the universal wrench assembly is horizontally installed.

Figure 1:
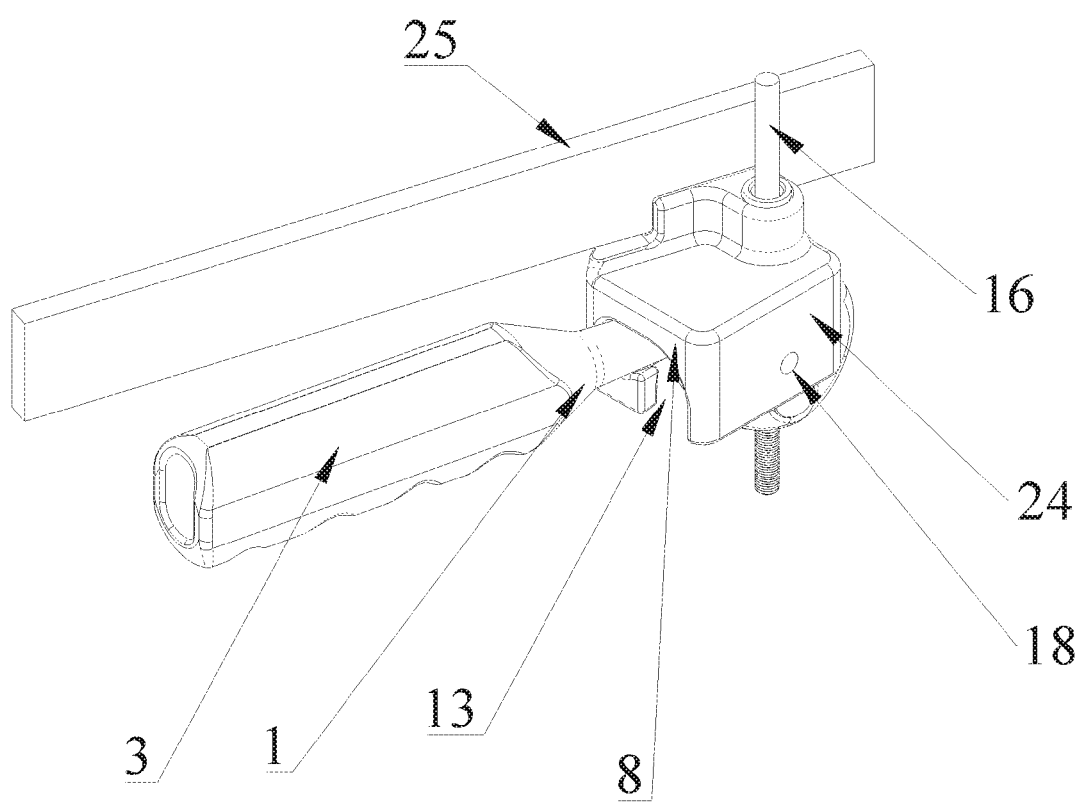
FIG. 1 is a structural schematic diagram of a wrench assembly of this invention.
Figure 2:
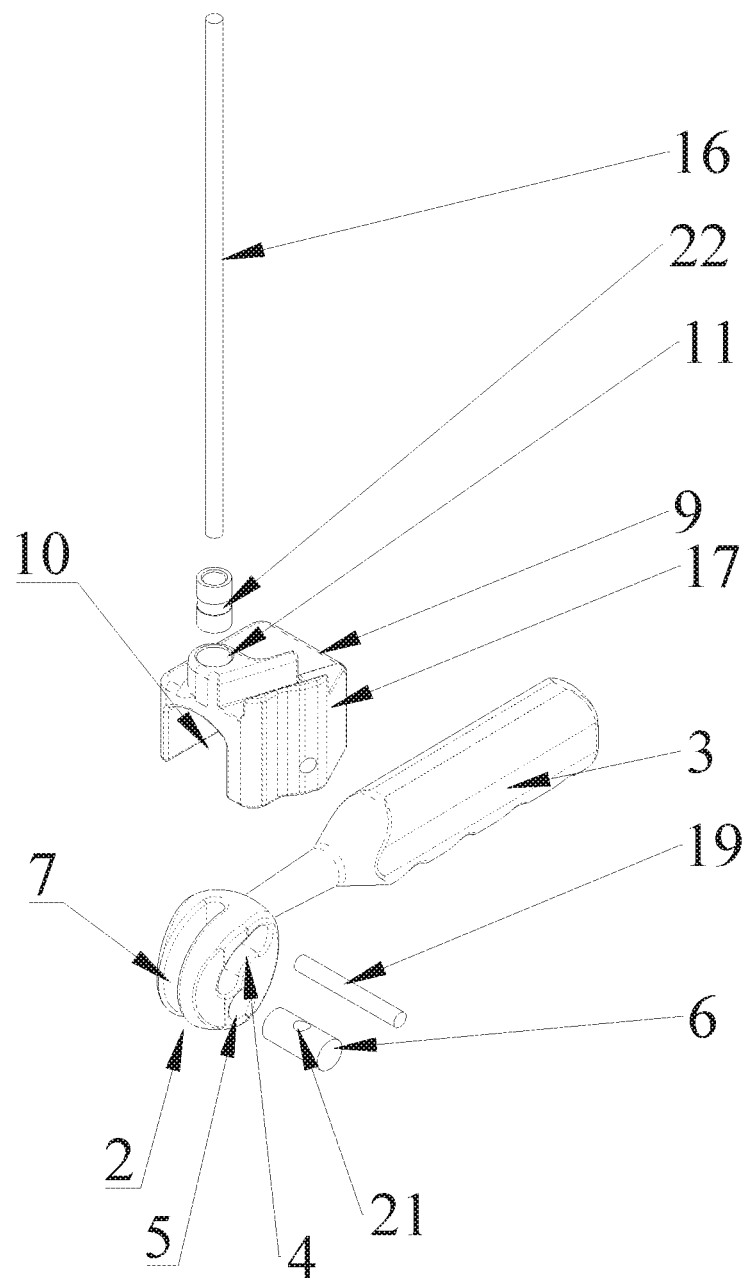
FIG. 2 is an exploded schematic diagram of the universal wrench assembly.
Figure 3:
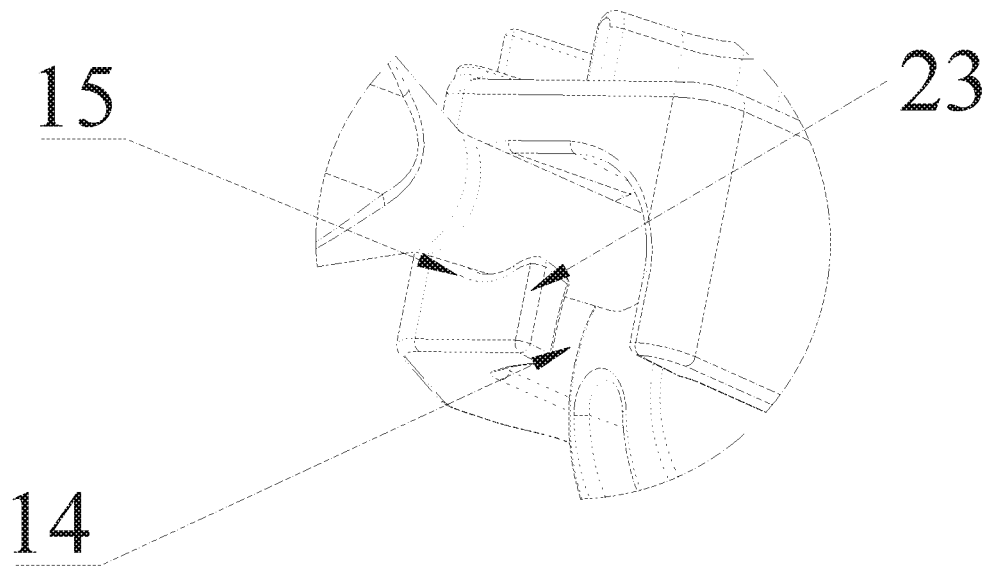
FIG. 3 is a schematic diagram of a local structure of a supporting housing of the universal wrench assembly.
Figure 4:
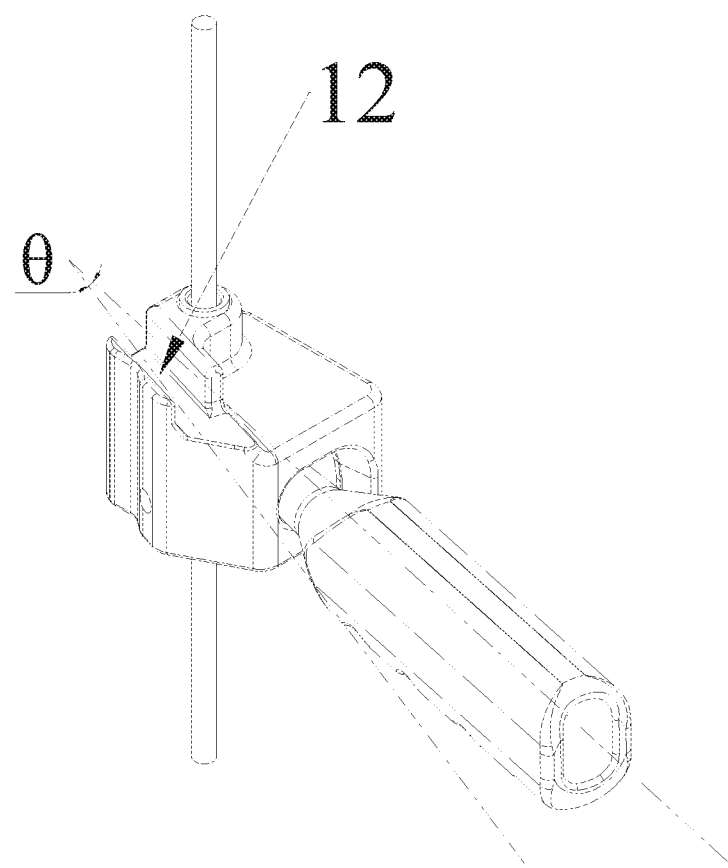
FIG. 4 is a structural schematic diagram of an elastic slot of the universal wrench assembly.
Figure 5:
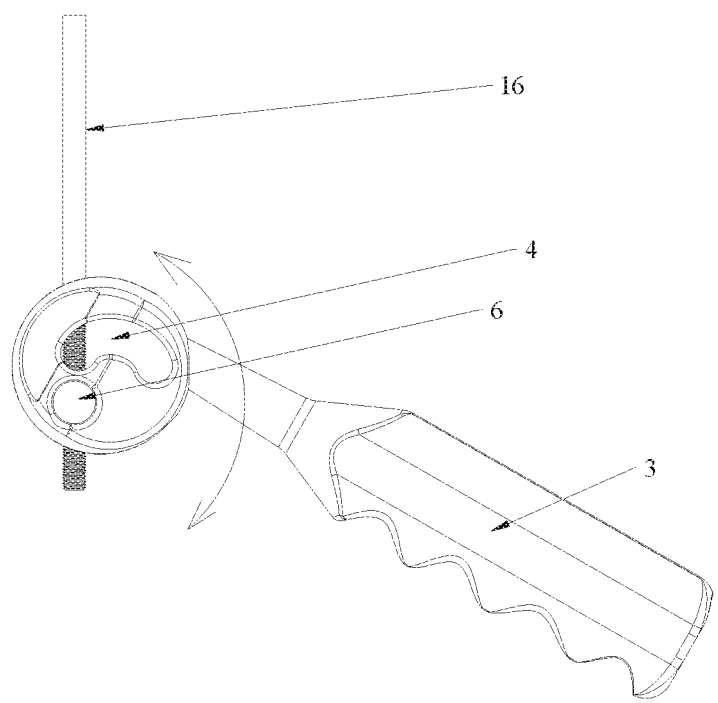
FIG. 5 is a schematic diagram of a rotating structure of the universal wrench assembly.

Embodiment: this invention discloses a universal wrench assembly (see FIGS. 1, 2, 3, 4, and 5), comprising: a wrench 1, wherein one end has a head 2 capable of cooperating with a workpiece (not shown) and exerting torque on the workpiece, the other end is provided with a handle 3; the head 2 has a groove 4 with a partial spherical surface for engaging the workpiece; one side of the groove 4 has a through-hole 5, a rotating shaft 6 is rotatablely disposed in the through-hole 5; a longitudinal outer wall of the head 2 is recessed inward to form a rotating cavity 7;

a supporting housing 24, having a side wall 8 facing the rotating shaft 6 and an upper wall 9 located above the rotating shaft 6, wherein the side wall 8 and the upper wall 9 connect and form an installing cavity 10; the head 2 is installed in the installing cavity 10; the upper wall 9 has an insert hole 11; an elastic slot 12 is disposed at the upper wall 9 and located at one side of the insert hole 11, the elastic slot 12 is used for locking a strip-shaped object 25 to achieve fixation; the side wall 8 has a strip-shaped through groove 13 for inserting the handle 3, a lower end of the through groove 13 has an opening 14, a lateral limiting area 15 is disposed above the opening, the limiting area 15 is used for limiting a part of the handle 3 which is rotated into the limiting area 15;

a fixing rod 16, wherein one end passes through the insert hole 11 and the rotating cavity 7 in turn and is rotatablely disposed at an axial central area of the rotating shaft 6; and when the wrench 1 rotates around the rotating shaft 6, the fixing rod 16 is used for relatively rotating around the rotating shaft 6 in the rotating cavity 10.

By fixing the elastic slot 12 of the supporting housing 24 to the strip-shaped railing 25 of the truck or the pick-up truck, the wrench 1 of the invention can rotate around the rotating shaft 6, such that the wrench 1 is horizontally fixed at the downside of the strip-shaped railing 25, and the handle 3 of the wrench 1 is limited by the limiting area 15 to prevent the handle 3 from falling, which authentically solve the disadvantage of occupying a large space causing the goods unable to be placed when the wrench is fixed vertically.

The supporting housing 24 may further have a barrier 17, and the barrier 17 is located at one side of the side wall 8 and faces the groove 4. The barrier 17 has a pin hole 18, an insert pin 19 is inserted in the pin hole 18, the insert pin 19 passes through the pin hole 18 to insert into the groove 4 and clings to the upper inside wall, when the wrench 1 rotates around the rotating shaft 6, the insert pin 19 is used for pressing against and sliding along the upper inside wall 8 of the groove 4.

The rotating shaft 6 may adopt a barrel nut, a through slot hole 21 may be disposed at the middle of the barrel nut, and the slot hole 21 cooperates with a thread of a lower end of the fixing rod 16. An insert 22 may be disposed between the insert hole 11 and the fixing rod 16, and the fixing rod 16 is in clearance fit with the insert 22.

A tail end of the limiting area 15 may have a locking block 23 protruding upward, and the locking block 23 is used for limiting the lateral movement of the handle 3. At present, since the existing universal wrench assembly is hung vertically, the handle thereof in the vertical direction is easily to be hooked outward by the goods, which leads to the locking failure of the wrench. Further, during the running of the truck, if the wrench is unlocked, the wrench will rush around inside the packing case as the vehicle bumps, which may cause the cover of the goods opened or even cause the wrench to be dropped out of the truck, greatly increasing the insecurity during driving. Disposing the locking block 23 protruding upward at the tail end of the limiting area 15 can effectively limit the lateral movement of the handle 3 and prevent the handle 3 from being hooked outward by the goods, which leads to the risk of locking failure of the wrench 1. Thus, the security is greatly increased during driving. The center axis of the elastic slot 12 and the axis of the handle 3 limited in the limiting area 15 have an angle θ of 5°-45°.

When this invention is implemented, the wrench is first rotated, and the handle of the wrench is rotated through the opening of the through groove and snapped into the lateral limiting area, and finally presses against the locking block. Then, the elastic slot of the supporting housing is engaged with the railing of the pick-up truck or the truck, thereby achieving fixation.

Although the invention is described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A universal wrench assembly, comprising:
a wrench, wherein one end of the wrench has a head capable of cooperating with a workpiece and exerting torque on the workpiece, another end of the wrench is provided with a handle; the head has a groove with a partial spherical surface for engaging the workpiece; one side of the groove has a through-hole, a rotating shaft is rotatablely installed in the through-hole; and a longitudinal outer wall of the head is recessed inward to form a rotating cavity;
a supporting housing, having a side wall facing the rotating shaft and an upper wall located above the rotating shaft, wherein the side wall and the upper wall connect and form an installing cavity; the head is installed in the installing cavity; the upper wall has an insert hole; an elastic slot is disposed at the upper wall and located at one side of the insert hole, the elastic slot is used for locking a strip-shaped object to achieve fixation; the side wall has a strip-shaped through groove for inserting the handle, a lower end of the through groove has an opening, a lateral limiting area is disposed above the opening, and the limiting area is used for limiting a part of the handle which is rotated into the limiting area; and a fixing rod, wherein one end of the fixing rod passes through the insert hole and the rotating cavity in turn and is rotatablely installed at an axial central area of the rotating shaft; and when the wrench rotates around the rotating shaft, the fixing rod is used for relatively rotating around the rotating shaft in the rotating cavity.

2. The universal wrench assembly of claim 1, wherein the supporting housing further has a barrier, and the barrier is located at one side of the side wall and faces the groove of the head.

3. The universal wrench assembly of claim 2, wherein the barrier has a pin hole, an insert pin is inserted in the pin hole, the insert pin passes through the pin hole to insert into the groove of the head and clings to an upper inside wall of the groove of the head, and when the wrench rotates around the rotating shaft, the insert pin is used for pressing against and sliding along the upper inside wall of the groove.

4. The universal wrench assembly of claim 1, wherein the rotating shaft is a barrel nut, a through slot hole is disposed at a middle of the barrel nut, and the slot hole cooperates with a thread of a lower end of the fixing rod.

5. The universal wrench assembly of claim 1, wherein an insert is disposed between the insert hole and the fixing rod, and the fixing rod is in clearance fit with the insert.

6. The universal wrench assembly of claim 1, wherein a tail end of the limiting area has a locking block protruding upward, and the locking block is used for limiting a lateral movement of the handle.

7. The universal wrench assembly of claim 1, wherein a center axis of the elastic slot and an axis of the handle limited in the limiting area have an angle of 5°-45°.

* * * * *